(12) United States Patent
Blatherwick et al.

(10) Patent No.: US 7,969,872 B2
(45) Date of Patent: Jun. 28, 2011

(54) DISTRIBUTED NETWORK MANAGEMENT

(75) Inventors: Peter Blatherwick, Ottawa (CA); Sonya Fullarton, Ottawa (CA); Thomas A. Gray, Mansfield (CA)

(73) Assignee: Mitel Networks Corporation, Ottawa, Ontario, CA (US)

( * ) Notice: Subject to any disclaimer, the term of this patent is extended or adjusted under 35 U.S.C. 154(b) by 324 days.

(21) Appl. No.: 11/781,345

(22) Filed: Jul. 23, 2007

(65) Prior Publication Data
US 2009/0028163 A1  Jan. 29, 2009

(51) Int. Cl.
*H04L 12/26* (2006.01)
*G06F 15/173* (2006.01)

(52) U.S. Cl. ............................ 370/230; 709/226
(58) Field of Classification Search .................. None
See application file for complete search history.

(56) References Cited

U.S. PATENT DOCUMENTS

| | | | |
|---|---|---|---|
| 5,657,446 A * | 8/1997 | Pinard et al. | 379/90.01 |
| 5,867,496 A * | 2/1999 | Peres et al. | 370/376 |
| 6,502,131 B1 * | 12/2002 | Vaid et al. | 709/224 |
| 7,062,548 B1 * | 6/2006 | Peres | 709/223 |
| 7,185,077 B1 * | 2/2007 | O'Toole et al. | 709/223 |
| 7,222,345 B2 * | 5/2007 | Gray et al. | 709/226 |
| 7,330,832 B1 * | 2/2008 | Gray et al. | 709/226 |
| 7,406,170 B2 * | 7/2008 | Gray et al. | 379/265.02 |
| 7,415,104 B2 * | 8/2008 | Gray et al. | 379/201.01 |
| 7,418,509 B2 * | 8/2008 | Koskelainen et al. | 709/229 |
| 7,676,548 B2 * | 3/2010 | Oh et al. | 709/208 |
| 2002/0101826 A1 * | 8/2002 | Giacopelli et al. | 370/252 |
| 2003/0101284 A1 * | 5/2003 | Cabrera et al. | 709/313 |
| 2004/0122901 A1 * | 6/2004 | Sylvain | 709/206 |
| 2004/0133641 A1 * | 7/2004 | McKinnon et al. | 709/204 |
| 2004/0158644 A1 | 8/2004 | Albuquerque et al. | |
| 2004/0213155 A1 * | 10/2004 | Xu et al. | 370/232 |
| 2005/0114541 A1 * | 5/2005 | Ghetie et al. | 709/232 |
| 2005/0125517 A1 * | 6/2005 | Norrgard et al. | 709/223 |
| 2006/0187836 A1 * | 8/2006 | Frey et al. | 370/235 |
| 2006/0262786 A1 * | 11/2006 | Shimizu et al. | 370/389 |
| 2007/0002897 A1 * | 1/2007 | Goshen et al. | 370/468 |
| 2007/0147346 A1 * | 6/2007 | Gilmartin | 370/352 |
| 2008/0253551 A1 * | 10/2008 | Gray et al. | 379/211.01 |
| 2009/0003194 A1 * | 1/2009 | Schelen et al. | 370/218 |
| 2009/0013032 A1 * | 1/2009 | Blatherwick et al. | 709/203 |
| 2009/0013062 A1 * | 1/2009 | Blatherwick et al. | 709/222 |
| 2009/0150523 A1 * | 6/2009 | Gray et al. | 709/220 |
| 2010/0049846 A1 * | 2/2010 | Ballette et al. | 709/224 |

OTHER PUBLICATIONS

Popovici, Eduard C. et al., "Consistency Support for a Decentralized Management in Close Multiparty Conferences Using SIP", IEEE 2003 pp. 295-300.
J. Rosenberg et al. "STUN—Simple Traversal of User Datagram Protocol (UDP) Through Network Address Translators (NATs)", Network Working Group, The Internet Society (Mar. 2003.
Petrie et al., A Frame for Session Initiation Protocol User Agent Profile Delivery (draft-ietf-sipping-config-framework-12), SIP-PING-IETF, May 2007.

* cited by examiner

*Primary Examiner* — Ayaz R Sheikh
*Assistant Examiner* — Timothy J Weidner

(57) ABSTRACT

This specification can provide resource allocation in peer-to-peer networks. This specification describes techniques whereby individual resources can in certain circumstances share their local views to create a network-wide view. The use of a performance manager facilitates this sharing. The sharing of fault information both access multiple devices and for a single device across restarts is also provided. A network-based aggregator for performance and fault analysis is also provided so that complex analysis algorithms can be provided centrally to assist network performance management.

16 Claims, 4 Drawing Sheets

DISTRIBUTED NETWORK MANAGEMENT

RELATED APPLICATION DATA

This application is related to application Ser. No. 11/781,352 titled "Network Traffic Management", and Ser. No. 11/781,319 titled, "Configuration of IP Telephony and Other Systems", filed on Jul. 23, 2007. The contents of the above cited applications are incorporated by reference herein.

FIELD

The present specification relates generally to networks and more specifically relates to distributed network management.

BACKGROUND

Voice over Internet Protocol ("IP") ("VoIP") provides for new possibilities in the provision of telephone and collaborative services to homes, small businesses and large enterprises. Formerly, cost was a major factor in the selection of these services. Homes and many small businesses could not afford to purchase advanced private branch exchange ("PBX") capabilities despite the many benefits that this could supply to them. The same could be said about branch office locations for large enterprises. It was difficult to justify PBX services due to the small numbers of employees over which the cost could be amortized.

VoIP that typically employs sophisticated processor based telephone sets, offers new possibilities for reducing telephone system cost. Such systems can be widely distributed linked by a data network and the desirable features of a PBX can be provided over the WAN from a remote location. A local dedicated controller is no longer required for small branch offices. Similarly a hosted PBX service can be provided to small business by specialist service providers.

Increasingly, VoIP networks with PBX-level services will be set up in homes, small business and large enterprise branch office locations. However, it is not economic or practical in these circumstances to expect that specialist personnel will be available to configure these networks, or for specialized equipment to be located at these locations. In a similar way, it is unrealistic to expect that trained specialists will be available to manage the operations of these networks. Home and small business systems will often be obtaining service from a network service provider. A service provider will be supplying service to thousands or tens of thousands of small businesses and to perhaps millions of home networks. In the case of a large enterprise, supplying of information technology ("IT") support to large numbers of branch offices, while more feasible than the service provider example, is still an expense that the enterprise would rather do without.

For example, one problem with such VoIP networks is that each device on such networks is independent and substantially functionally identical when it comes to the operation of VoIP services. Yet, such devices all share the resources of an internal local area network ("LAN") and a shared link to a wide area network ("WAN") such as the Internet. It is over these shared links that all calls to devices not on the LAN will be set up. Typically, the bandwidth on the external link will be limited. In typical networks, it will not be possible for all devices to have an outgoing call set up at the same time. This leads to a difficulty in that there are situations in which calls could fail or experience poor quality of service because too many calls are simultaneously trying to share the common limited pool of bandwidth.

There are prior art approaches to such problems. One approach is to integrate the devices into a larger application. This is the sort of resource management that is done by a PBX. The PBX provides an environment in which devices such as telephones and external connection resources such as trunks (IP or otherwise) are controlled by an integrated software system. Resource Manager software elements are often provided that contain policies on the allocation of resources. Since the PBX has visibility of all calls, bandwidth can be managed by disallowing calls which would exceed capacity. Similarly, access to and use of other shared resources in the system can also be managed centrally.

Another approach is to provide intelligence in the resource. The resource itself would be able to allocate access to itself based on the relative priorities of the requests. This could be done with a resource which has intrinsic intelligence. However a dumb or legacy resource can be wrapped with elements such as proxies, mediators, etc., that can provide this intelligence. One example of intelligence in the resource is use of the Internet Engineering Task Force ("IETF") Resource ReSerVation Protocol ("RSVP"). This can allow end devices such as IP Phones to negotiate bandwidth resources directly with the network infrastructure, for example using Resource Reservation Protocol (RSVP as described in Braden et al., Resource ReSerVation Protocol (RSVP)—Version 1 Functional Specification Network Working Group, IETF Request for Comments 2205. However these techniques can add considerable complexity to deployment, and require RSVP-aware network elements be in place across all parts of the network where call media would potentially flow. The latter assumption can add large complexity and/or costs and may not be feasible in the general case of arbitrary pairs of endpoints involved in the flows, which is extremely common, if not fundamental, to VoIP applications.

Yet in certain configurations, no higher level application such as a PBX can assumed. Having such a higher level application would defeat the economies that are an advantage of highly distributed VoIP systems. For the wrapper or proxy alternative, no server is available on which to carry this service—devices are functionally identical with respect to their control of bandwidth and the lower level bandwidth resource has no capacity to supply this service. Wrapper and proxy functions generally do not involve themselves in call details, has no visibility of available bandwidth or other resources, and may not have knowledge of all calls or other resource consumption in progress.

SUMMARY

This specification can provide resource allocation in peer-to-peer networks, wherein groups of functionally identical device to share resources (bandwidth, servers etc.). This specification describes techniques whereby individual resources can in certain circumstances share their local views to create a network-wide view. The use of a performance manager in certain aspects facilitates this sharing. The sharing of performance metrics and fault information both access multiple devices and for a single device across restarts is also provided. A network-based aggregator for performance and fault analysis is also provided so that complex analysis algorithms can be provided centrally to assist network management.

DETAILED DESCRIPTION OF THE EMBODIMENTS

Figure 1:
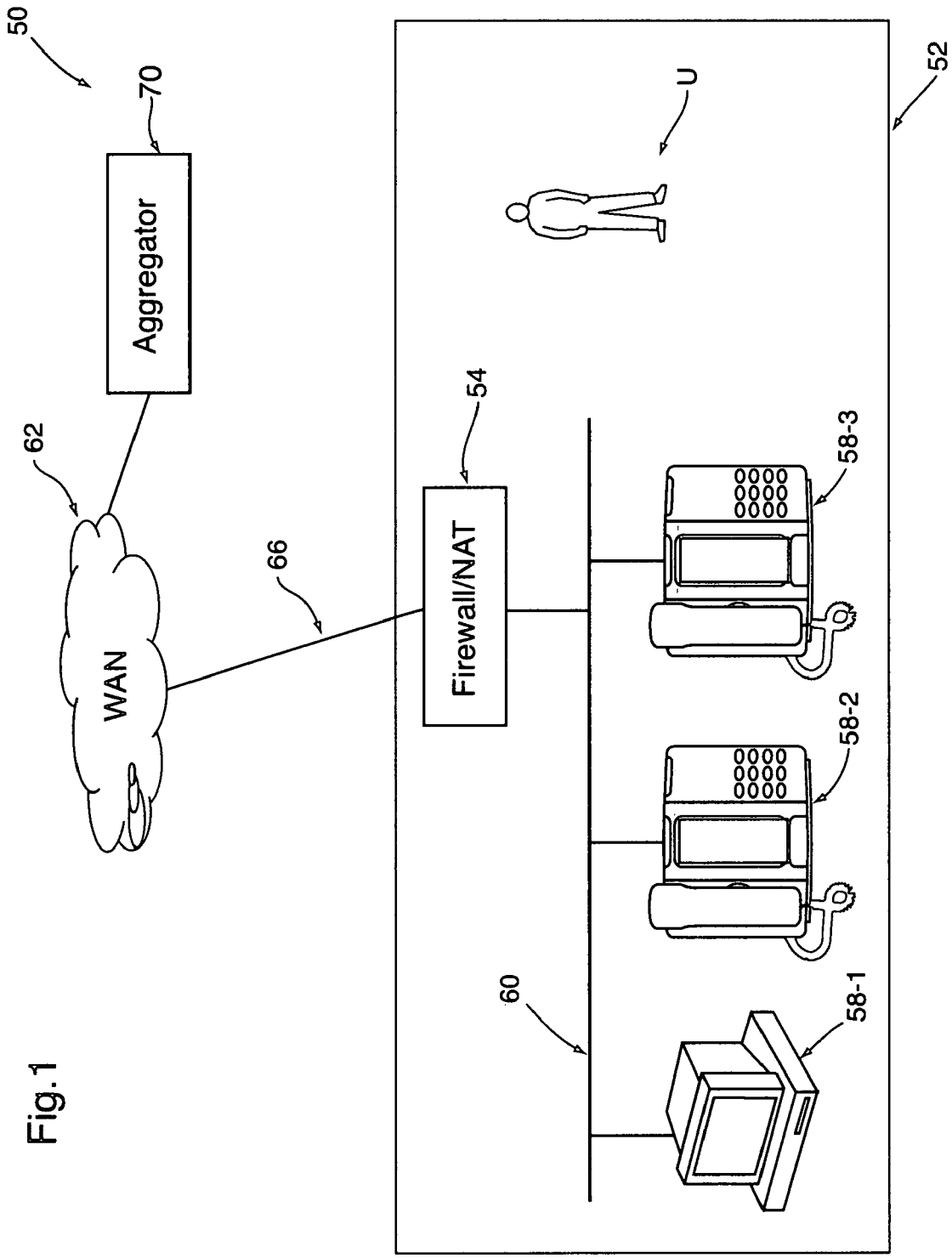
FIG. 1 shows a schematic representation of a system for distributed network management.

FIG. 1 provides a schematic representation of a system 50. System 50 includes a small network 52, used in, for example, a home, a small business or an enterprise branch office. Network 52 is self-configuring according to, for example, the teachings of A Framework for Session Initiation Protocol User Agent Profile Delivery by Petrie et al. ("Petrie"). Due to the self-configuring nature of network 52, a user U with little or no technical experience can set up devices on network 52.

Network 52 comprises a combined firewall and network address translator ("NAT") 54, although firewall and NAT 54 need not be combined. Network 52 also comprises a number of independent devices 58-1, 58-2, 58-3 that are functionally identical in respect to the setting up of VoIP collaborative sessions. (For greater clarity, sessions refers to SIP sessions or the like. SIP provides for endpoints to negotiate arrangements (sessions) between themselves. Among the parameters that can be negotiated in these sessions are the type of media and the amount of bandwidth authorized. These parameters can be and are typically renegotiated several times within a session.) Collectively, devices 58-1, 58-2, 58-3 are referred to as devices 58, and generically as device 58. Devices 58 all connect to firewall/NAT 54 via a local area network ("LAN") 60.

In a present embodiment, device 58-1 is a desktop computer, while devices 58-2 are VoIP telephones. However, other types of devices are contemplated including personal digital assistants, entertainment devices, smart phones, whether wired or wireless.

Network 52 connects to a wide area network ("WAN") 62 via a shared link 66. WAN 62 can be, though need not be, the Internet. Of note is that all devices 58 that connect to WAN 62 do so via shared link 66.

System 50 also includes an aggregator 70 connected to WAN 62, which will be discussed in greater detail below.

Figure 2:
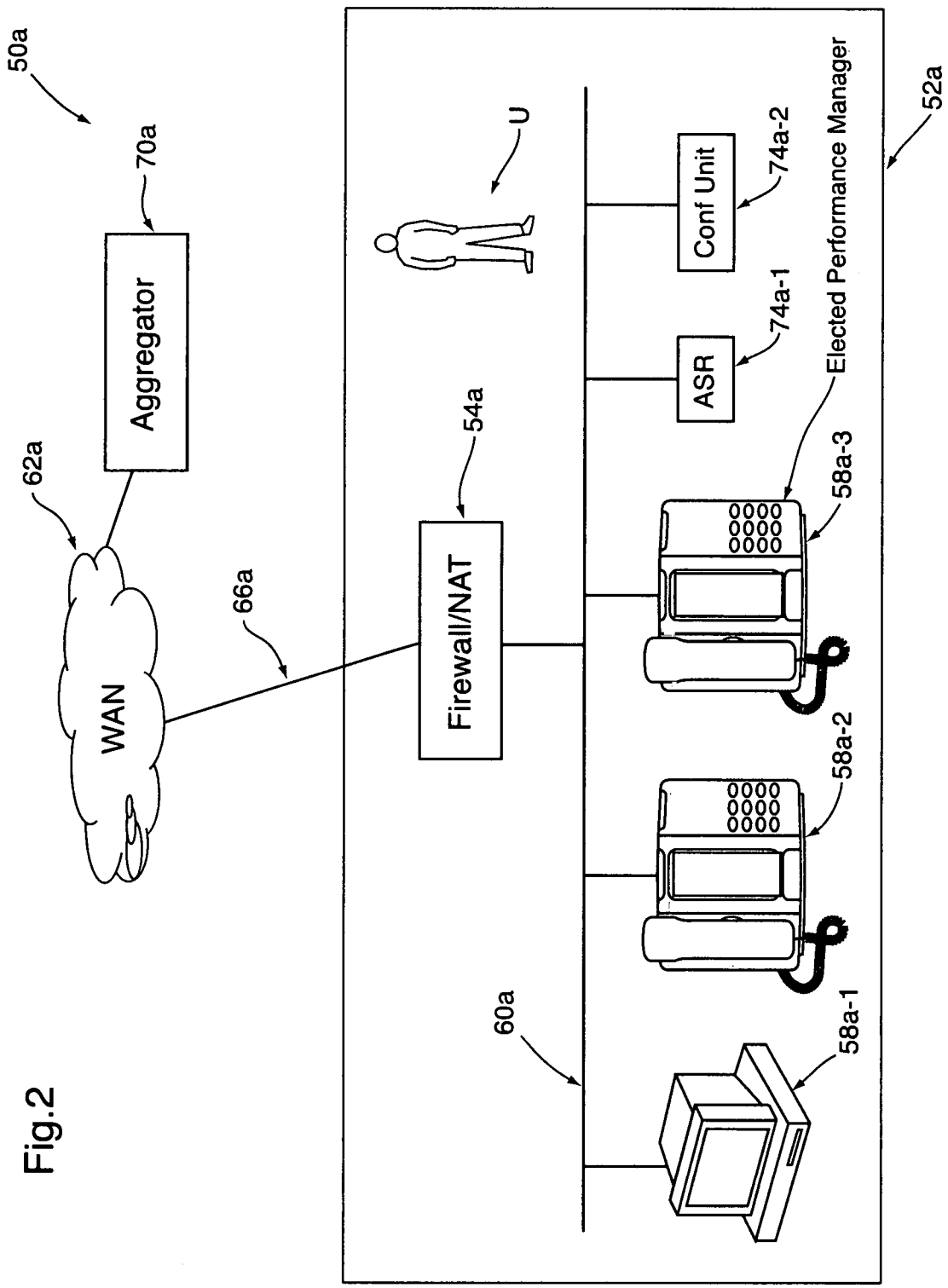
FIG. 2 shows a schematic representation of an extended version of the system of FIG. 1.

As will be explained further below, system 50 is also configured to manage shared resources, as well as collection and reporting of aggregate statistics, diagnostics, fault detection and other data to higher-order entities in the overall system 50. To illustrate more thoroughly, FIG. 2 shows system 50a which is an extension of system 50 in FIG. 1. System 50a includes many of the same elements as system 50 and accordingly elements in system 50a that correspond to elements in system 50 include the same reference except followed by the suffix "a". Like system 50, system 50a includes independent communication devices 58. However in addition, system 50a also includes other devices 74a on network 52a, which can be configured as shared resources for communications devices 58a-1, 58a-2 and 58-3 to utilize. Software or firmware (not shown) within devices 58a-1, 58a-2 and 58-3 is configured to be aware of the possibility of the presence of devices 74a and can be set up to use them if they are available.

Shared devices 74a on network 52a in this embodiment are an automatic speech recognizer ("ASR") 74a-1 and a conference unit ("Conf Unit") 74a-2. Conference unit 74a-2 can also be referred to as conference server. Many other types of shared resources could be envisioned here as well, such as media servers, local PSTN gateways, voicemail servers, etc.

Additionally, there is a shared common link 66a to WAN 62a which the communication devices 58a will all share for VoIP calls and other collaborative applications. Shared link 66a and LAN 60a have limited capacity. The other shared resources exemplified by 74a-1 and 74a-2 also have limited capacity. Hence coordinated arbitration for use is of these shared resources is provided.

In the case of shared bandwidth over the link 66a, it can be assumed that an estimate of the total available bandwidth on link 66a has been provided to each of devices 58a in their configuration. This configuration can make use of configuration files as described in Petrie. This information can be obtained, for example, from user U during the time that he/she was registering for service with the service provider (not shown). User U can be asked for a broad classification of access speed (e.g. dial up, T1, DSL etc.). A rough estimate of capacity can be obtained from the response from user U, and would be added to the profile information at time of provisioning the new service to the user U (or the entity which is associated with user U and/or network 52a). As will be discussed further below, it is also possible to dynamically estimate bandwidth capacity of link 66a by monitoring of quality of service ("QoS") measures. Similar configurations regarding capacity of other shared resources such as 74a-1 and 74a-2 can also be provided. However this information alone may only indicate total capacity of the resource, and is not sufficient on its own in certain circumstances to manage sharing of the resource by many devices 58a.

Performance or bandwidth estimation is part of VoIP operation. Before any call is accepted or created, sufficient remaining bandwidth to handle a call from that device 58a must be managed. Similar analogies can apply to a very broad range of shared resources, as in the example additional shared devices 74a. For example in the case of ASR device 74a-1, it may be used as an Interactive Voice Response ("IVR") server for the rest of the communication devices 58a, however due to limited capacity only a certain number of calls are allowable to use ASR device 74a-1 at any given time.

Figure 3:
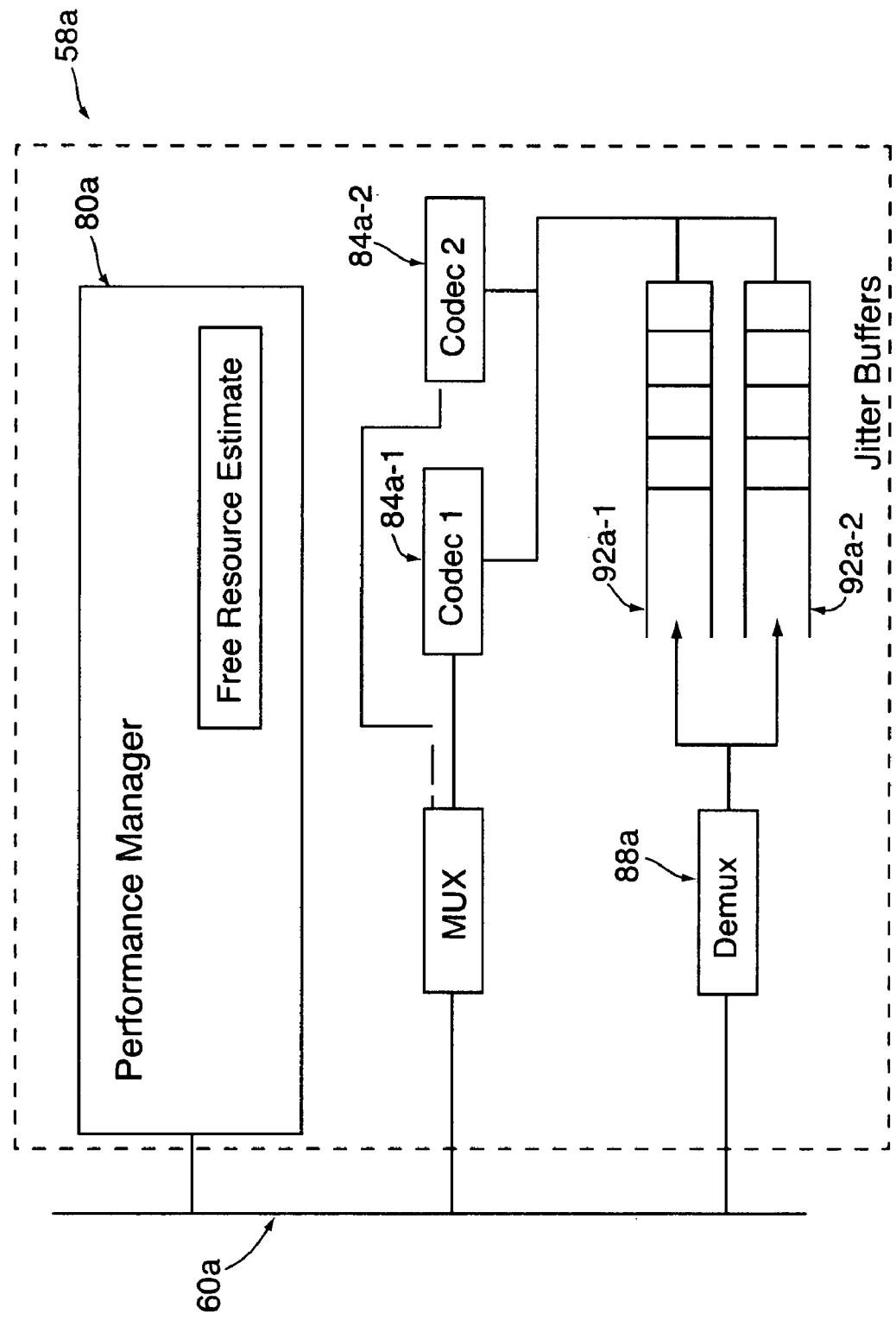
FIG. 3 shows a schematic representation of internal structure of one of the devices of FIG. 2.

FIG. 3, is a representation of the internal structures within each device 58a that relate to the management of bandwidth usage over link 66a.

Thus, each device 58a includes a performance manager 80a. Bandwidth estimation is performed as one task by performance manager 80a. Performance manager 80a contains a current estimate of the amount of bandwidth that devices 58a-1, 58a-2 and 58a-3 are using as well as an estimate of the maximum bandwidth that they are permitted to use.

Device 58a will also contain one or more of codecs, represented in FIG. 3 as codecs 84a-1 and 84a-2. These codecs 84a can be dynamically selected so as to reduce and/or minimize the amount of bandwidth used while still meeting the voice quality performance requirements requested by the user.

Performance manager 80a will also have access to relevant data from a packet receiver 88a. Mis-estimation of bandwidth usage may result in congestion. Congestion may result in lost or misordered packets, or in increased packet delays, which will manifest itself in levels of jitter buffers 92a running low or empty. Performance manager 80a may optionally be configured to check the validity of its estimates by use of the measurements of buffers 92a.

Under conditions of resource over-utilization, detected by either excess requested bandwidth for connections, or by detection of congestion conditions, the performance manager may, optionally, take remedial actions in adjusting its estimation algorithm for new connections, and/or by renegotiating the codec 84a used for current connections, or the like.

In one implementation, network 52a can be operated with control of bandwidth effected locally at each device 58a. In this implementation, each device 58a devices 74a on network 52 could be given an estimated portion of the total bandwidth available on link 66a and could make its own decisions on the use of that bandwidth. Efficient use of this bandwidth could result from over-subscription, whereby each device 58a and each device 74a would be given more bandwidth than a strict proportionate share of link 66a would allow and an optimistic assumption would be made that the statistical properties of the total offered load of all devices would make congestion, and therefore performance impairments, occur at an acceptably low rate.

In an alternative implementation, each device 58a can be given an exclusive proportionate share, however this per-device estimation can result in under-utilization of the bandwidth of link 66a, except when all devices 58a make a call simultaneously, which is statistically rare.

The same considerations also apply equally to any such shared resource.

In a third implementation, performance can improved if decisions on connection admission are made with knowledge of the offered load of all devices 58a using the link 66a, not just one. Currently available bandwidth across link 66a could be allocated to devices 58a, on a call-by-call basis, with certain and not just probabilistic knowledge.

Figure 4:
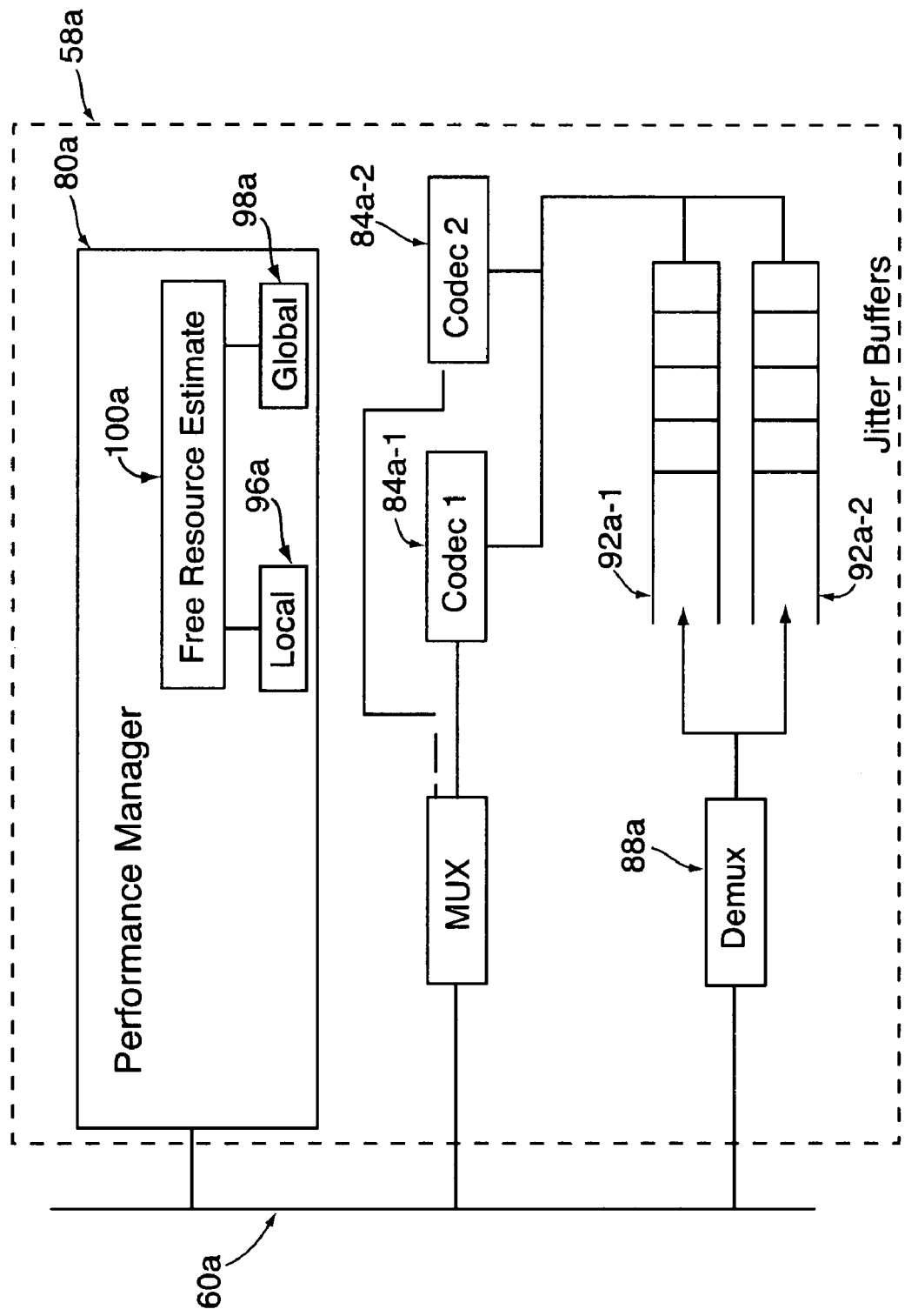
FIG. 4 shows the schematic representation of FIG. 3 with further detail.

The third implementation is illustrated in FIGS. 2 and 4. FIG. 2 indicates that device 58a-3 is elected as the operating performance manager 80a on behalf of all devices 58a in network 52a. This election process can be done in any desired manner. For example, each device 58a can broadcast or multicast metrics indicating its capacity to perform the task. The device 58a with the highest metric will detect that it is the most suitable and broadcast a message indicating its assumption of the role.

In operation, the performance manager 80a of the elected device 58a-3 creates an estimate of the total bandwidth used for VoIP on network 52a and as well an indication as to whether or not network 52a is congested. To do so, performance manager 80a gathers information from all devices 52a and 74a. For example, using a Session Initiation Protocol ("SIP") Publish method or equivalent, all devices 52a and 74a will register the amount of bandwidth that they are using, over what path in the network (LAN-local vs across link 66a). Similarly all devices 52a and 74a may provide indications from their jitter buffers 92a as to the congestion that they are seeing on network 52a, as measured by packet loss, delay, or other measures. Each device 52a and 74a will also request notification of these values on a network-wide basis, for example using a SIP Subscription method or similar. All devices 52a potentially using the link 66a would Subscribe to the elected performance manager 80a to receive one or more Notify messages of the status of link 66a (e.g. link 66a is full, for example), and all would use SIP Publish to send to the elected Performance Manager 80a their usage of link 66a. Alternatively a Subscribe/Notify relationship could be used in both directions, or a non SIP-based request response approach could be used in this interaction.

At this point it should be clarified that the exemplary embodiment herein is discussed in relation to management of a shared resource in the form of link 66a. However, the embodiments can be modified to manage other types of shared resources, other than or in addition to link 66a, such as devices 74a. The bandwidth on the LAN 60 can also be estimated in this way.

Since each device 58a will receive global estimates of bandwidth usage and congestion measurements from the current elected performance manager 80a, then each device 58a capable of operating as a performance manager will contain all knowledge required to function as the elected performance manager 80a. Each such device 58a can therefore assume this role in the eventuality that a new performance manager 80a is required, for example should the current one fail or become disconnected, or become overloaded for some reason. Note, however, not all devices 58a in network 52a need be capable of operating as a performance manager 80a. There is at least one such device 58a capable of operating as the elected performance manager 80a in the local network, however it is important that more than one such device 58a is available, for resiliency reasons.

FIG. 4 shows the internal structures of each device 58a that are included in FIG. 3. However, in FIG. 4, the presence of a local free resource estimate 96a and a global resource estimate 98a in associate with the overall free resource estimate 100a itself. Each device 58a will utilize global resource estimate 98a information as part of its connection admission process to network 52a. FIG. 4 indicates that each device 58a maintains its own usage within local free resource estimate 96a and have available the global usage within global resource estimate 98a via its subscription to performance manager 80a. After the admission or termination of every call, each device 58a will update (Publish) its usage of bandwidth used at performance manager 80a. Each device 58a will optionally also update its performance metrics to the current performance manager 80a from its jitter buffers 92a (error, missing and out of order packets, jitter buffer below a critical value etc.) at suitable intervals, and the end of calls, or upon the occurrence of an important event (jitter buffer empty etc.).

If a congestion condition occurs, each device 58a can renegotiate connections to use codecs with lower bandwidth requirements, reduce the number of simultaneous connections allowed etc. This can be done with knowledge from all devices 58a. So a device 58a that is just newly-attempting to make connections can make its decisions based on surer knowledge of congestion conditions.

An alternative to the above method would be for all connection decisions to be made by the elected performance manager 80a. Each device 58a would request connection admission for each call that it makes, and also inform the elected performance manager 80a when the calls have ended. The elected performance manager 80a would make the decisions as to whether or not to accept any and all calls. It would maintain the same global estimates as before and use these in its decisions. The elected performance manager 80a receives all requests for admission and accepts or rejects each of them. The elected performance manager 80a would also maintain status on all calls. Each device 58a having its own performance manager 80a on network 52a will subscribe to this global information from elected performance manager 80a. Since each device 58a has the same knowledge of the conditions as the elected performance manager 80a, each device will be capable of assuming the role of the elected performance manager 80a with no loss of service.

A fourth implementation of this would be for all devices 58a on network 52a to periodically broadcast or multicast their usage of bandwidth and other performance information. All devices 58a-2 and 58-3 equipped with a performance manager on network 52a would receive this information. They individually creates estimates of the total bandwidth used and can use this in making decisions about use of shared resources such as link 66. Each device 58a-2 and 58-3 in this case determines and maintains an individual list of the devices 58a that are operating on network 52a. This would include maintaining an estimate of the current bandwidth and performance usage of each device 58a. A list would be maintained with individual entries for each device 58a from which a performance message has been received. This list would be used as the basis for the global estimate in that the bandwidth used can be summed or otherwise processed to create the global estimate. If a message is received from a device 58a not previously observed a new entry on the list would be created for it. Timers may optionally be maintained on each entry. If no message from a device 58a is received within a timeout period, the device will be removed from the list. On receiving a new message from a device, the estimate in that message will replace the previous estimate in the list.

Aggregation of Local Network Performance Data

A network-based aggregator 70a is shown in FIG. 2. The address of aggregator 70a can be supplied by either the device manufacturer or service provider in the manner described in, for example, Applicant's co-pending application U.S. patent application Ser. No. 11/781,352 entitled "CONFIGURATION OF IP TELEPHONY AND OTHER SYSTEMS" the contents of which are incorporated herein by reference. ("P1660US00") As described for the elected Configuration Manager in P1960US00, the elected performance manager 80a may from time-to-time, register important information at aggregator 70a. The site for aggregator 70a can be the same or different from the configuration aggregator discussed in P1960US00 they are logically separate. As well there may be multiple aggregators 70a in the overall system, each responsible for aggregation of different aspects of the gathered data (e.g. QoS stats, fault detection). This information can be analyzed by software at aggregator 70a to make recommendations on the performance of network 52a and its elements. For example, this software at aggregator 70a could analyze the frequency of congestion occurrences and recommend that link 66a be replaced with a higher-bandwidth link if congestion on link 66a is occurring frequently or a link 66a be replaced with a lower-bandwidth link for economy if congestion on link 66a is not being observed.

Extension to Other Functions

FIG. 2 also indicates other devices 74a on network 52a such as a conference circuit device 74a-1 and an automatic speech recognizer 74a-2. The devices 58a on network 52a can be programmed to look for the existence of devices 74a and to use their capabilities as they exist. These devices 74a can be shared fairly in a manner similar to that used to manage the external bandwidth on link 66a. Thus performance manager 80a can contain similar structures to facilitate sharing of these devices 74a as well. This sharing can also include management of the larger LAN bandwidth that exists on network 60a.

Each device 58a can also include self-diagnostic routines. The results of these diagnostics can also be registered with the elected performance manager 80a and as well with aggregator 70a. A device 58a that is reregistering on network 52a may receive its past self-diagnostic history. That device 58a can then adjust its behavior based on better knowledge of its maintenance status. For example, a device 58a that is continually resetting can know of this fact and enter a state in which will prevent, or reduce the likelihood of such resetting from recurring. The elected performance manager 80a can also be aware of the self-diagnostic state of all devices and can use this to detect network wide causes. For example a fluctuating or noisy power supply carried over LAN 69a can cause many devices 58a to reset at once. The elected performance manager 80a can be equipped with an expert system or similar technology to make these sorts of diagnoses. Similarly, such expert system could be resident in the aggregator 70a, fault or other self-diagnostics data delivered to the aggregator 70a as previously described, and diagnostics carried out at aggregator 70a.

Sharing Across the WAN or a Network of Routers

The above-described embodiments concentrated on the sharing of a common resource by a group of devices 58a that are situated on LAN 60a or the like, such as a virtual LAN. Such an arrangement can allow devices 58a to find each other by use of broadcast messages. However there are situation in which the sharing of a common resource is required where devices 58a are situated across a routed network such as an enterprise WAN. An example of this sharing could be a group of IP PBXs in enterprise networks. It is common for several PBXs to be concentrated in a local zone. There will usually be ample bandwidth in the zone for media paths to be set up without significant chance for congestion. However, these devices will likely be sharing one or more common external physical links that connect them to the external network (PSTN, Internet, other locations on the enterprise network). The Applicant's co-pending application U.S. patent application Ser. No. 11/781,352 entitled "NETWORK TRAFFIC MANAGEMENT" the contents of which are incorporated herein by reference. ("P1955US00) P1955US00 describes such a network. However P1955US00 focuses on what could be called composition management, where there are a group of managers each managing a resource. These managers cooperate to compose these resources into a larger whole (a network of routes in that case). This sharing will need to be supplemented by the sharing described in this case if a zone contains multiple PBXs that all need to share the common external bandwidth.

The techniques described in this specification can be used to accomplish the management of devices 58a which are situated across a routed network such as an enterprise WAN. Instead of a broadcast message, a multicast message can be used. The routers in the local zone can be programmed to provide a multicast route across the routed network for this purpose. Each device 58a will be provided with the address of the multicast route as part of its configuration process. This could be accomplished by use of Dynamic Host Configuration Protocol ("DHCP"), or Domain Name Service ("DNS"), for example. The technique described in this specification can be used to set up the sharing service among them with the broadcast messages being replaced by messages sent on the multicast route.

The teachings herein can be utilized in combination with P1960US00 and/or P1950US00.

All documents identified herein are hereby incorporated by reference.

The invention claimed is:

1. A device for connection to a network comprising:
   an interface for connecting to said network having a shared resource;
   a memory and processing unit connected to said interface; said memory and processing unit configured to execute a user application that utilizes said shared resource;
   said memory and processing unit configured to execute a performance manager, in addition to said user application, for managing allocation of said shared resource between said device and at least one other device also connected to said network that also utilizes said shared resource; said device and said at least one other device configured to share information regarding use of said shared resource with each other; wherein said device and at least one other device are each configured (i) to maintain respective instances of said performance manager, (ii) to deliver an announcement to each other a level of internal resources that are available in each of said devices or other device metric relevant to the device's ability to act as said performance manager, and (iii) to automatically elect which of said performance managers of said devices will manage allocation of said shared resource based on an evaluation of one or more of said device metrics, wherein the elected performance manager broadcasts a message indicating its automatic election.

2. The device of claim 1 wherein the one of said devices having a greater one of said level of internal resource or other device metric is automatically elected as said performance manager that will manage allocation of said shared resource for all of said devices.

3. The device of claim 1 wherein said devices are interconnected via a local area network and said announcement is delivered via a broadcast.

4. The device of claim 1 wherein said devices are interconnected across a wide area network and said announcement is delivered via a multicast.

5. The device of claim 1 wherein each said device and said at least one other device are each configured to maintain estimates of usage of said shared resource by each of said device and said at least one other device; said devices further configured to provide an announcement to each other of said devices of said estimates.

6. The device of claim 5 wherein renegotiation for access to said shared resource by said device or said at least one other device is based on said estimates.

7. The device of claim 5 wherein said estimates are used for allocation of said shared resource.

8. The device of claim 5 wherein said estimates are used for determining whether to permit said at least one other device to access said shared resource.

9. The device of claim 1 wherein each said device and said at least one other device are each configured to maintain estimates of congestion of said shared resource as experienced by each of said device and said at least one other device.

10. The device of claim 1 wherein said performance manager is configured to maintain estimates of global usage of said shared resource.

11. The device of claim 10 wherein said performance manager is configured to determine whether to permit said at least one other device to access said shared resource based on said estimates of global usage.

12. The device of claim 10 wherein said at least one other device is configured, based on said estimates of global usage, to determine whether sufficient shared resources exist to access said shared resource.

13. The device of claim 1 wherein said performance manager is configured to aggregate performance statistics of shared resource.

14. The device of claim 1 wherein said performance manager is configured aggregate fault information associated with utilization of said shared resource.

15. The device of claim 1 further configured to connect to an aggregator; said aggregator configured to consolidate performance statistics of utilization of said shared resources; said performance manager configured to communicate with said aggregator to deliver said performance statistics to said aggregator.

16. The device of claim 15 further configured to connect to an aggregator; said aggregator configured to perform an analysis of said performance statistics and to provide results of said analysis to said performance manager.

* * * * *